(12) United States Patent
Ma et al.

(10) Patent No.: US 11,428,603 B2
(45) Date of Patent: Aug. 30, 2022

(54) ASSEMBLY QUALITY DETECTING DEVICE AND METHOD FOR WIND SCREEN CLEANING SYSTEM BASED ON STREAMLINE PATTERN

(71) Applicant: JIANGSU UNIVERSITY, Jiangsu (CN)

(72) Inventors: Zheng Ma, Jiangsu (CN); Min Han, Jiangsu (CN); Yaoming Li, Jiangsu (CN); Lizhang Xu, Jiangsu (CN); Xinzhong Wang, Jiangsu (CN); Zhong Tang, Jiangsu (CN); Hongxin Li, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 418 days.

(21) Appl. No.: 16/626,987

(22) PCT Filed: Sep. 7, 2018

(86) PCT No.: PCT/CN2018/104542
§ 371 (c)(1),
(2) Date: Dec. 27, 2019

(87) PCT Pub. No.: WO2020/019416
PCT Pub. Date: Jan. 30, 2020

(65) Prior Publication Data
US 2021/0239564 A1    Aug. 5, 2021

(30) Foreign Application Priority Data

Jul. 26, 2018    (CN) .......................... 201810831189.7

(51) Int. Cl.
*G01M 9/04* (2006.01)
*A01F 12/24* (2006.01)
(Continued)

(52) U.S. Cl.
CPC ............... *G01M 9/04* (2013.01); *A01F 12/24* (2013.01); *A01F 12/444* (2013.01);
(Continued)

(58) Field of Classification Search
CPC .......... G01M 9/04; G01M 9/067; G01M 9/00; G01M 9/02; G01M 9/062; G01M 9/065;
(Continued)

(56) References Cited

U.S. PATENT DOCUMENTS 4,950,388 A    8/1990    Stafford

FOREIGN PATENT DOCUMENTS

| CN | 87105301 A | | 3/1988 | |
|---|---|---|---|---|
| CN | 101608979 A | * | 12/2009 | ............ G01M 19/00 |

(Continued)

*Primary Examiner* — Arpad Fabian-Kovacs
(74) *Attorney, Agent, or Firm* — Kaplan Breyer Schwarz, LLP

(57) ABSTRACT

An assembly quality detection device and a method for a wind screen cleaning system based on streamline pattern, includes a main body of a test bench and a detection system. The main body of the test bench includes a test bench rack and a cleaning centrifugal fan; the inside of the test bench rack is provided with a cleaning space. The detection system includes a smoke generation and transmission device, a two-degree-of-freedom smoke fixed-point release mechanism, a high-speed image acquisition system and a control system. A fixed base is installed on the upper end of the outlet of the cleaning centrifugal fan, a linear moving guide rail device is installed on the fixed base, the linear moving guide rail device is equipped with a moving slider, the moving slider is installed with a rotating mechanism, the rotating mechanism output end is provided with a smoke releasing duct, the smoke releasing duct is communicated with the smoke generation and transmission device. The detection device and method can test the manufacturing and (Continued)

assembly quality of the cleaning system of the combine harvester by combining the characteristics of wind tunnel streamline pattern with image processing and corresponding mathematical operation.

10 Claims, 6 Drawing Sheets

(51) Int. Cl.
    *A01F 12/44* (2006.01)
    *G01M 9/06* (2006.01)
    *G01P 5/00* (2006.01)
    *G01M 9/08* (2006.01)
    *G01M 9/00* (2006.01)
    *G01M 9/02* (2006.01)

(52) U.S. Cl.
    CPC ........... *A01F 12/446* (2013.01); *G01M 9/067* (2013.01); *G01P 5/00* (2013.01); *G01M 9/00* (2013.01); *G01M 9/02* (2013.01); *G01M 9/062* (2013.01); *G01M 9/065* (2013.01); *G01M 9/08* (2013.01)

(58) Field of Classification Search
    CPC ... G01M 9/08; G01M 9/06; G01P 5/00; A01F 12/24; A01F 12/444; A01F 12/446; A01F 12/44
    See application file for complete search history.

(56) References Cited

FOREIGN PATENT DOCUMENTS

| | | | | |
|---|---|---|---|---|
| CN | 204044087 U | | 12/2014 | |
| CN | 104764582 A | | 7/2015 | |
| CN | 204924181 U | | 12/2015 | |
| CN | 105230233 A | | 1/2016 | |
| CN | 105409472 A | * | 3/2016 | ............. A01F 12/18 |
| CN | 107290127 A | | 10/2017 | |
| CN | 107389294 A | | 11/2017 | |
| CN | 108076855 A | * | 5/2018 | ............. A01F 12/44 |
| CN | 109443420 A | * | 3/2019 | ............. G01D 21/02 |
| CN | 111034475 A | * | 4/2020 | ........... A01F 12/446 |
| CN | 111982557 A | * | 11/2020 | .......... G01M 99/005 |
| CN | 112825681 A | * | 5/2021 | .............. A01F 11/06 |
| CN | 113261432 A | * | 8/2021 | .......... A01F 12/446 |
| DE | 102014011480 B3 | | 11/2015 | |
| JP | 0060-151532 A | | 8/1985 | |
| JP | 2010-243309 A | | 10/2010 | |
| WO | WO-2014169904 A1 | * | 10/2014 | ................ D21F 1/44 |

* cited by examiner

ASSEMBLY QUALITY DETECTING DEVICE AND METHOD FOR WIND SCREEN CLEANING SYSTEM BASED ON STREAMLINE PATTERN

FIELD

The present invention relates to the field of testing agricultural machinery equipment, and particularly to an assembly quality testing device and method for a wind screen cleaning system based on streamline pattern.

BACKGROUND

Cleaning components are the key components of a combine harvester, and their working performance and reliability are related to the performance index and working reliability of the whole machine. The cleaning components of combine harvester generally use wind screen structure, which is mainly composed of cleaning centrifugal fan and vibrating screen. When the manufacturing and assembling quality of cleaning components including cleaning centrifugal fan vibrating screen, and the screen box are unqualified, the working performance index of cleaning system will be difficult to reach the standard. Therefore, quality detection must be carried out in the manufacturing and assembly of the cleaning components. At present, the quality detection of the cleaning components in the actual production process of China's combine harvester enterprises is relatively simple and extensive, so it is in urgent need of a testing device and method that can timely detect and reflect the manufacturing and assembly quality of the cleaning components in the production stage of the whole machine.

The utility model patent with issuance No. CN204924181U discloses an assembly quality detection device for an engine bearing shell, which is composed of camera, robot, picture processing system, display device and other components. It can judge the assembly quality of engine bearing shell by comparing the measured pictures with the set standards. The utility model patent with issuance No. CN204044087U discloses an assembly quality detection device for a sealing ring of an e-cigarette atomizer, including installation frame, detection module and controller. The assembly quality detection of the sealing ring of e-cigarette atomizer is realized by taking photos of the sealing ring inside the detection station. All the patents disclosed above use image processing technology for detection of the components manufacturing and assembly quality. However, the acquisition of images and analysis process are all aimed at components with definite geometry, which are different from the detection and analysis of flow field characteristics and cannot be used to detect whether the flow field of the cleaning system of the combine harvester is normal or not.

The invention patent application with publication No. CN107389294A discloses an air flow field test platform of harvester cleaning device, which mainly comprises two parts: test device and data acquisition device, the test device mainly comprises fan and air passage, and the data acquisition device comprises high-speed camera and pipeline type wind speed transmitter. It can accurately measure the velocity distribution of fan air flow in the airflow passage, observe the movement state of agricultural materials in different flow fields in real time, and accurately simulate different working conditions through stepless and real-time regulation of fan motion parameters, with simple operation and high measurement accuracy. The patent application can measure the flow field of cleaning device, but cannot reflect the relationship between flow field and manufacturing assembly quality.

The invention patent application with publication No. CN107389294A discloses a PIV wind tunnel test method for measuring the air flow field of warships. A large number of tracer particles are scattered in the flow field of the test wind tunnel, which makes the tracer particles follow the flow field. The angle between the vertical line and the wind tunnel flow direction in the ship model, the roll angle or pitch angle of ship model are changed by two-dimensional PIV measurement and then get a number of groups of measurement data of tracer particles in different measurement cross-sections of ship model, and finally generate a number of air flow field velocity nephograms and air flow field streamline maps to complete the spatial reconstruction of different measurement cross-sections of ship model. The patent application can be used for measuring air flow field of ship, but it cannot reflect the relationship between air flow field and manufacturing assembly quality, and it cannot be directly used for manufacturing assembly quality detection of combine harvester cleaning system.

SUMMARY

In view of the shortcomings of the existing technology, the present invention provides an assembly quality detection device and method for the wind screen cleaning system based on streamline pattern, which can detect the assembly quality of the combined harvester cleaning system by using the streamline pattern characteristics of the wind tunnel in combination with the image processing and corresponding mathematical operations.

The present invention realizes the technical purpose mentioned above through the following technical means.

An assembly quality detecting device for wind screen cleaning system based on streamline pattern includes main body of a test bench and a detection system. The main body of the test bench includes a test bench rack and a cleaning centrifugal fan; the cleaning centrifugal fan is installed on the test bench rack; and a cleaning space is arranged inside the test bench rack.

The detection system includes a smoke generation and transmission device, a two-degree-of-freedom smoke fixed-point release mechanism, a high-speed image acquisition system and a control system. The smoke generation and transmission device is used to produce smoke. The two-degree-of-freedom smoke fixed-point release mechanism is connected with the smoke generation and transmission device to move the smoke to the outlet of the cleaning centrifugal fan.

The high-speed image acquisition system is located outside the main body of the test bench, and is used for high-speed acquisition of streamlined smoke images of the cleaning space and transmitting the image to the control system; the control system is configured to control the two-degree-of-freedom smoke fixed-point release mechanism, and store and analyze the streamlined smoke image of the high speed image acquisition system.

Further, the two-degree-of-freedom smoke fixed-point release mechanism includes a smoke releasing duct, a fixed base, a linear moving guide rail device and a rotating mechanism; the fixed base is installed at the upper end of the outlet of the cleaning centrifugal fan; the fixed base is equipped with a linear moving guide rail device, and the moving direction of the linear moving guide rail device is parallel to the axis of the rotating shaft of the cleaning centrifugal fan; and the linear moving guide rail device is provided with a moving slider, and a rotating mechanism is installed on the moving slider. The smoke releasing duct is installed at the output end of the rotating mechanism, and the smoke releasing duct is suspended at the outlet of the cleaning centrifugal fan; the smoke releasing duct is communicated with the smoke generation and transmission device.

Further, the upper boundary of the cleaning space is composed of a tangential flow concave plate and a longitudinal axial flow concave plate, the upper boundary of the cleaning space is above the cleaning centrifugal fan, and the middle boundary of the cleaning space is between the upper boundary of the cleaning space and the cleaning centrifugal fan, and the middle boundary of the cleaning space is composed of a cleaning screen; the lower boundary of the cleaning space is located at the outlet of the cleaning centrifugal fan, and the lower boundary of the cleaning space is composed of the lower air duct of the cleaning room; the rear boundary and the front boundary of the cleaning space are located on each of both sides of the rotating shaft of the cleaning centrifugal fan, respectively; the rear boundary of the cleaning space is composed of an inner plate, and the front boundary of the cleaning space is composed of an outer plate. The inner and outer plates are mounted on the test bench rack.

Further, the high-speed image acquisition system includes a high-definition stroboflash compensation light and a high-speed camera; the high-speed camera shooting angle is perpendicular to the direction of airflow movement in the cleaning room, and the shooting angle covers the cleaning space for high-speed acquisition of dynamic streamlined smoke images formed by the action of the cleaning airflow; the high-definition stroboflash compensation light is symmetrically arranged on both sides of the high-speed camera to supplement light and eliminate streamlined smoke shadows for high-speed camera processes.

Further, the outer plate is transparent plate, the surface of the inner plate is dark, and the high-speed image acquisition system is directly facing the outer plate.

Further, the control system includes a motor driving module a, an image acquisition and processing module b and a detection, analysis and diagnosis module c; and the motor driving module a is used for driving and controlling the linear moving guide rail device and the rotating mechanism. The image acquisition and processing module b is used to collect, store and analyze the dynamic streamlined smoke image output by the high-speed image acquisition system, and the detection, analysis and diagnosis module c is used to summarize, compare and diagnose the analysis results of the image acquisition and processing module b.

Further, the smoke generation and transmission device produces the white smoke with particle size less than or equal to 5 micron.

Further, the outlet of the smoke releasing duct has a "V" shape, and the acute angle formed by the two cross sections of the "V" type and the flow direction of the cleaning centrifugal fan is not less than 60°.

An assembly quality detecting method for wind screen cleaning system based on streamline pattern includes the following steps:

Section division of air outlet: dividing the air outlet section of the cleaning centrifugal fan into an N×M area, taking the point at the lower left corner of the fan section as the apex O, and setting the coordinate of any point in the air outlet section of the cleaning centrifugal fan to be (x, y), wherein $0 \leq x \leq M$, $0 \leq y \leq N$, N and M are natural numbers;

Initial position image acquisition: set $x_0=0$, $y_0=0$, the motor driving module a of the control system controls the linear moving guide rail device and the rotating mechanism to move the end of the smoke releasing duct to the starting coordinate value $(x_0, y_0)$, the smoke generation and transmission device starts to generate smoke, the high speed camera captures at a T frame rate, and delivers the collected image to the image acquisition and processing module b;

Streamline pattern image acquisition of all outlet cross-section areas: the linear moving guide rail device and the rotating mechanism are controlled by the motor driving module a of the control system to move the end of the smoke releasing duct to all outlet cross-section areas respectively, and the images collected by the high-speed camera are F sheets;

Streamline pattern acquisition via image analysis: the image acquisition and processing module b analyses F sheets of images and gets streamline pattern of all images.

Streamline pattern comparison and diagnosis: streamline pattern of all images is transmitted to the detection, analysis and diagnosis module c, the detection, analysis and diagnosis module c compares and diagnoses the streamline pattern of all images with streamline pattern in standard library.

Further, the streamline pattern acquisition via image analysis includes the following steps:

S01: determining the coordinates of discrete points of streamline in the ith image: marking i as image number, $1 \leq i \leq F$; initial value i=1, carrying out grayscale processing, image binarization and establishing coordinate system for the ith image, obtaining the coordinates of discrete points of streamline in the ith image and marking them as $a_{i,k}$ wherein k denotes the ordinal number of each discrete point, $k \in N^+$;

S02: determining the coordinate value matrix of each discrete point of streamline in the ith image as: $A_i=[a_{i,1}, a_{i,2}, a_{i,3}, \ldots, a_{i,k}]$;

S03: recycling of judgement, when i<F, then i=i+1, repeating steps S01-S02; when i=F, jumping to S04;

S04: calculating the averaged discrete point set for all acquired images: $A=F^{-1}\Sigma_{i=1}^{i=F} A_i$;

S05: calculating the least squares fitting curve of the streamline matrix: $y_1=\text{ployfit}(A(1,:),A(2,:),3)$; the obtained least squares fitting curve is the streamline pattern of all the images obtained after the aggregation.

The beneficial effect of the present invention is as follows.

1. The assembly quality testing device and method for a wind screen cleaning system based on streamline pattern according to the present invention utilizes wind tunnel streamline pattern characteristics combined with image processing and corresponding mathematical operations to detect the assembly quality of the combine harvester cleaning system.

2. The assembly quality testing device and method for a wind screen cleaning system based on streamline pattern according to the present invention includes three modules of a motor driving module a, an image acquisition and processing module b and a detection, analysis and diagnosis module c, which are convenient for operation control.

3. In the assembly quality testing device and method for a wind screen cleaning system based on streamline pattern according to the present invention, the outlet of the smoke releasing duct is of a "V" shape, and the acute angle formed by the two sections of the "V" type and the flow direction of the cleaning centrifugal fan is not less than 60°, forming a bifurcated structure for facilitating airflow and reducing drag.

4. In the assembly quality testing device and method for a wind screen cleaning system based on streamline pattern according to the present invention, the linear moving guide rail device enables the smoke releasing duct to be kept parallel with the fan air outlet during the movement.

1—test bench rack; 2—tangential flow concave plate; 3—cleaning screen; 4—cleaning centrifugal fan; 401—fan casing; 402—fan impeller; 403—air distributing plate; 404—upper plate of air outlet; 405—lower plate of air outlet; 5—inner plate; 6—longitudinal axial flow concave plate; 7—lower air duct of the cleaning room; 701—grain conveying auger; 702—slide plate; 8—outer plate; 9—longitudinal beam of rack; 10—fan drive unit; 1001—speed adjustable motor; 1002—motor base; 1003—drive belt; 1004—motor pulley; 1005—fan pulley; 1006—fan shaft; 1007—bearing base; 11—smoke generation and transmission device; 1101—smoke generator; 1102—smoke-conducting hose; 12—two-degree-of-freedom smoke fixed-point release mechanism; 1201—smoke releasing duct; 1202—linear moving guide rail device; 1203—rotating mechanism; 1204—fixed base; 1205—moving slider; 13—high speed image acquisition system; 1301—high-definition stroboflash compensation light; 1302—high speed camera; 1303—camera tripod; 1304—image transmission line; 14—control system; a—motor driving module; b—image acquisition and processing module; c—detection, analysis and diagnostic module.

DETAILED DESCRIPTION

The present invention is further described in connection with the accompanying drawings and specific embodiments, but the scope of protection of the present invention is not limited thereto.

Figure 1:
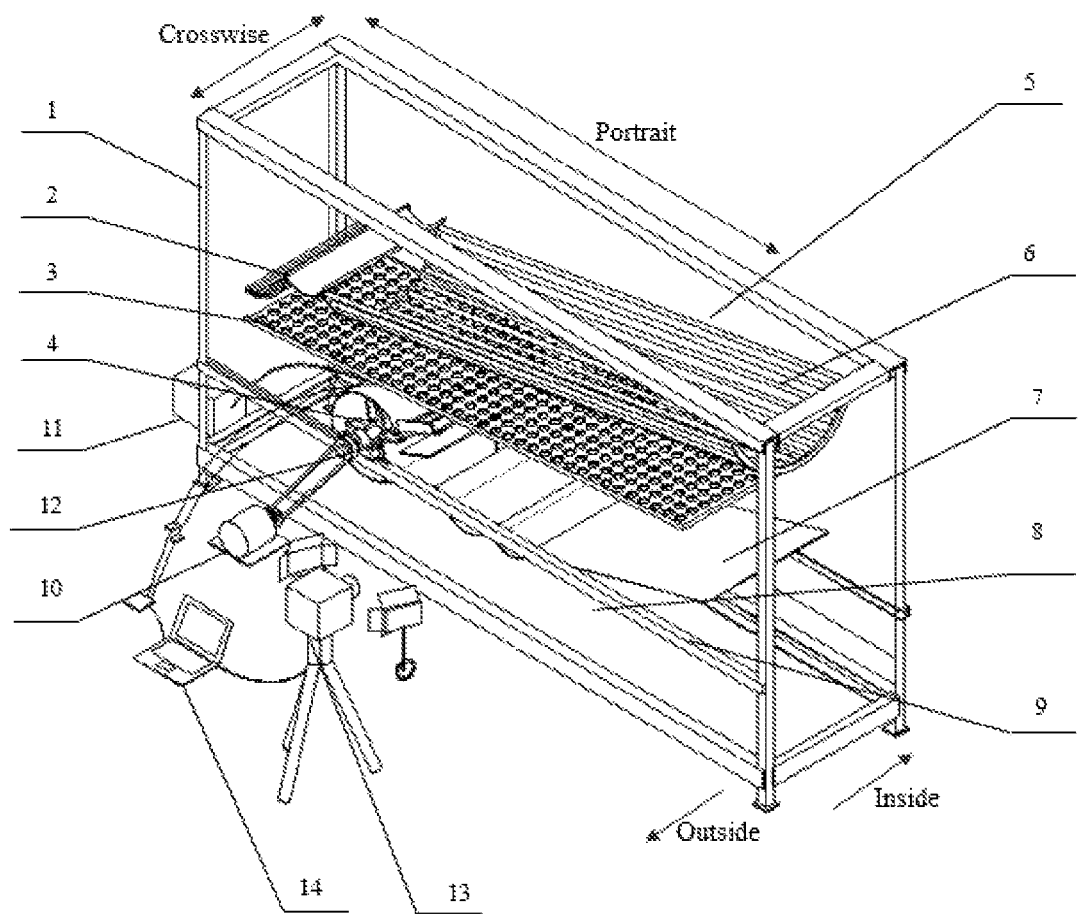
FIG. 1 is a three-dimensional view of an assembly quality testing device and method for a wind screen cleaning system based on streamline pattern according to the present invention.
Figure 2:
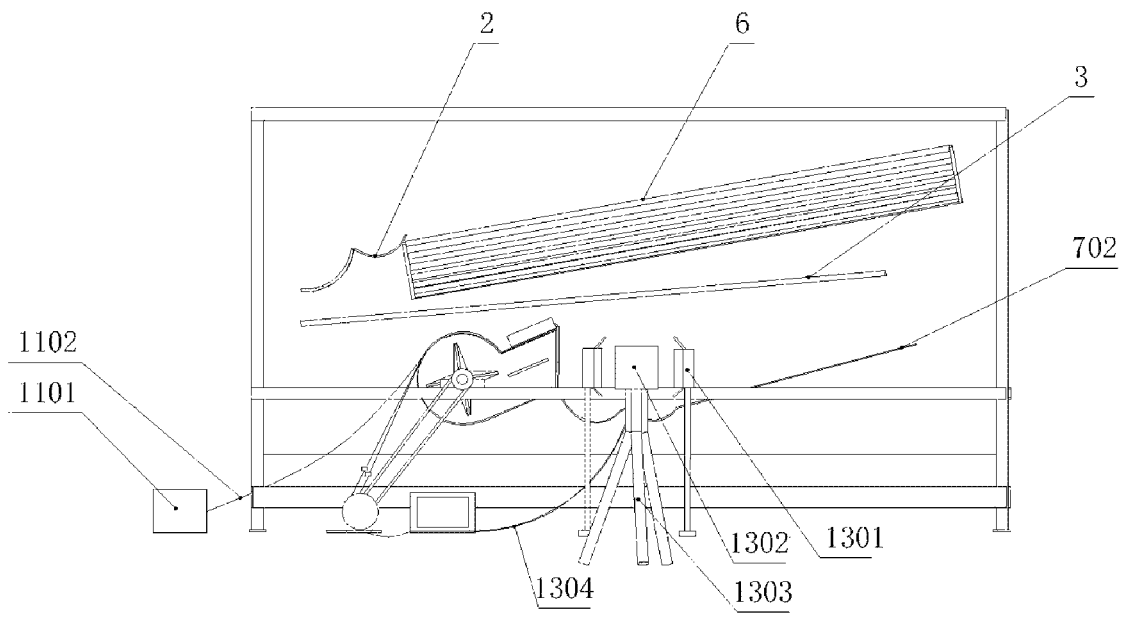
FIG. 2 is a front elevational view of FIG. 1.
Figure 3:
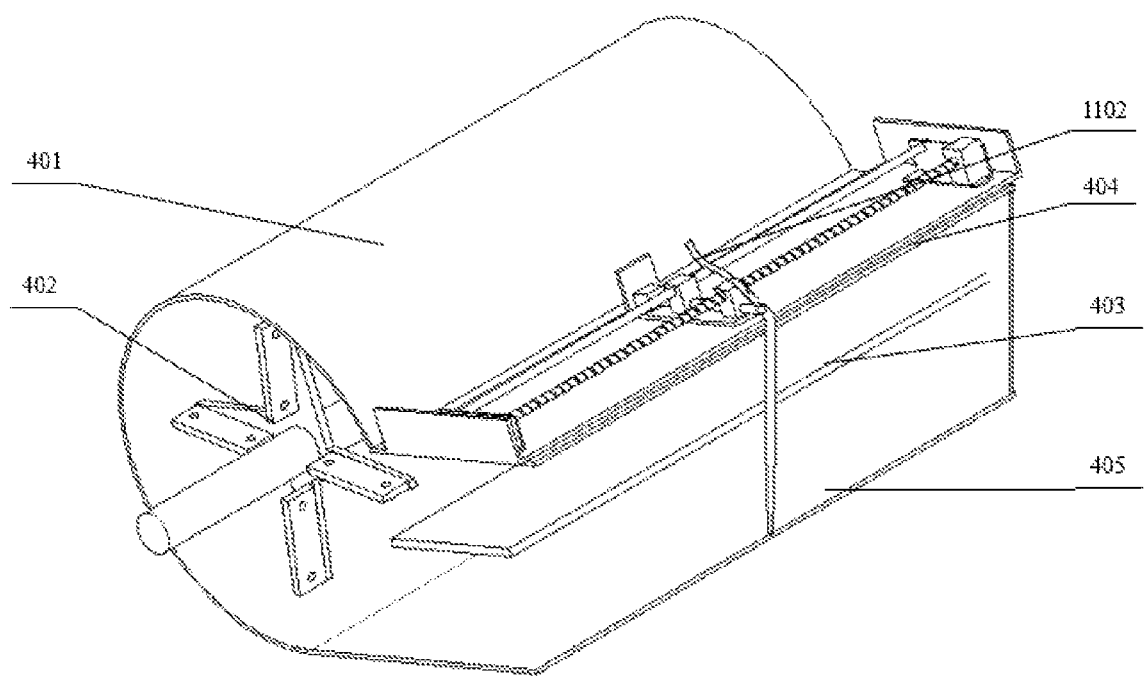
FIG. 3 is a perspective view of the detection system of the present invention.

As shown in FIG. 1, FIG. 2 and FIG. 3, the assembly quality detection device for the wind screen cleaning system based on streamline pattern includes the main body of a test bench and a detection system. The main body of the test bench includes the test bench rack 1 and the cleaning centrifugal fan 4. The cleaning centrifugal fan 4 is installed on the test bench rack 1. A cleaning space is provided in the test bench rack 1. The cleaning space can imitate the cleaning space in a combine harvester. Because the size and the position of composition of the cleaning space in different combine harvesters are different, the following is an example of a conventional combine harvester: the upper boundary of the cleaning space is composed of a tangential flow concave plate 2 and a longitudinal axial flow concave plate 6. The upper boundary of the cleaning space is located above the cleaning centrifugal fan 4. The middle boundary of the cleaning space is between the upper boundary of the cleaning space and the cleaning centrifugal fan 4, and the middle boundary of the cleaning space is composed of a cleaning screen 3. The lower boundary of the cleaning space is located at the outlet of the cleaning centrifugal fan 4. The lower boundary of the cleaning space is composed of the lower air duct of the cleaning room 7. As shown in FIG. 2, the lower air duct of the cleaning room 7 is composed of a grain conveying auger 701 and a slide plate 702; the rear boundary and the front boundary of the cleaning space are located on both sides of the rotating shaft of the cleaning centrifugal fan 4, respectively; the rear boundary of the cleaning space is composed of an inner plate 5, and the front boundary of the cleaning space is composed of an outer plate 8. The outer plate 8 is transparent acrylic plate and the inner plate 5 is black material. The inner plate 5 and the outer plate 8 are installed on the test bench rack 1. The aforementioned tangential flow concave plate 2, longitudinal axial flow concave plate 6, cleaning screen 3, grain conveying auger 701 and slide plate 702 are all components of combine harvester. Their assembly and location relations are limited by national standards or disclosed by public patents, so they are not stated here.

Figure 8:
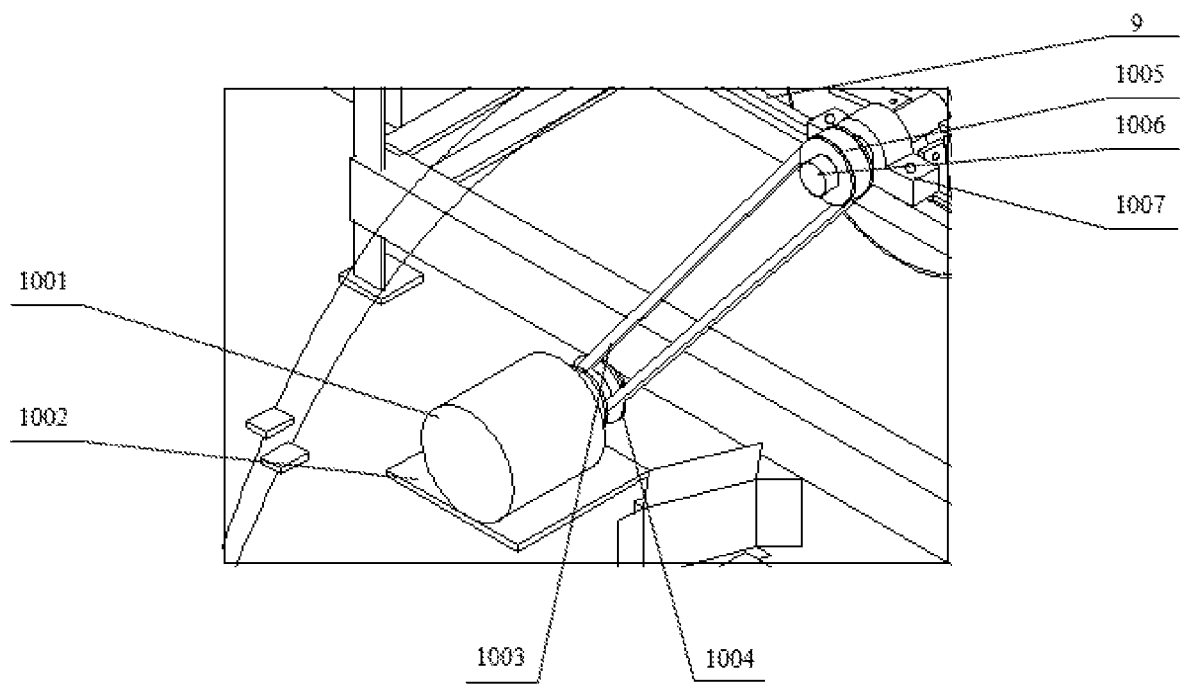
FIG. 8 is a partial enlarged view of the axial view of the cleaning centrifugal fan of the present invention.

As shown in FIGS. 3 and 8, the cleaning centrifugal fan 4 includes a fan casing 401, a fan impeller 402, an air distributing plate 403, an upper plate of the air outlet 404, an lower plate of the air outlet 405, and a fan driving device 10. One end of the outer casing 401 is connected to the upper plate of the air outlet 404, and the other end of the fan casing 401 is connected to the lower plate of the air outlet 405. The upper plate of the air outlet 404 and the lower plate of the air outlet 405 are parallel to each other, and the air distributing plate 403 is located between the upper plate of the air outlet 404 and the lower plate of the air outlet 405, the fan impeller 402 is located at the center of rotation of the fan casing 401. The fan driving device 10 includes a speed adjustable motor 1001, a motor base 1002, a transmission belt 1003, a motor pulley 1004, a fan pulley 1005, a fan shaft 1006, and a bearing base 1007. The fan shaft 1006 is provided with a fan impeller 402 and the bearing seat 1007 is arranged at both ends of the fan shaft 1006. The test bench rack 1 includes the longitudinal beam 9 of rack. The longitudinal beam 9 of rack has a groove on one side. The bearing seat 1007 is installed on the groove of the longitudinal beam 9 of rack. The fan pulley 1005 is installed at one end of the fan shaft 1006, and the speed adjustable motor 1001 is installed on the motor base 1002. A motor pulley 1004 is installed on the input shaft of the speed adjustable motor 1001, and the motor pulley 1004 is connected with the fan pulley 1005 through the transmission belt 1003. When the cleaning centrifugal fan 4 is replaced, it can slide out from one side of the groove of the longitudinal beam 9 of rack as a whole.

Figure 4:
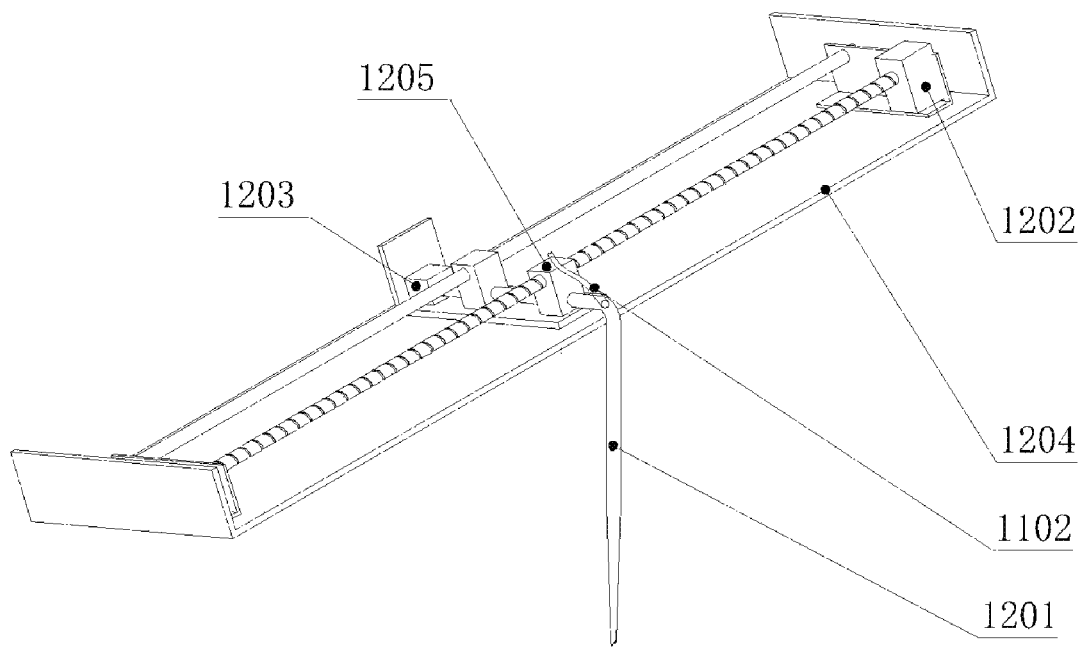
FIG. 4 is a perspective view of a two-degree-of-freedom smoke fixed-point release mechanism according to the present invention.
Figure 5:
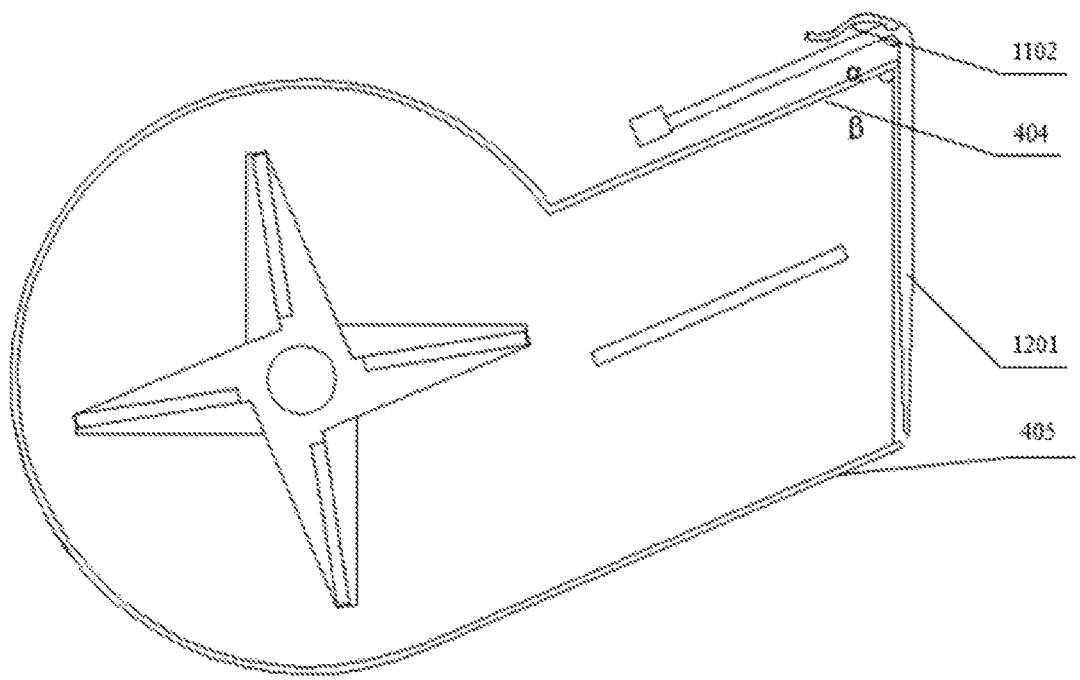
FIG. 5 is a left side view of FIG. 3.
Figure 6:
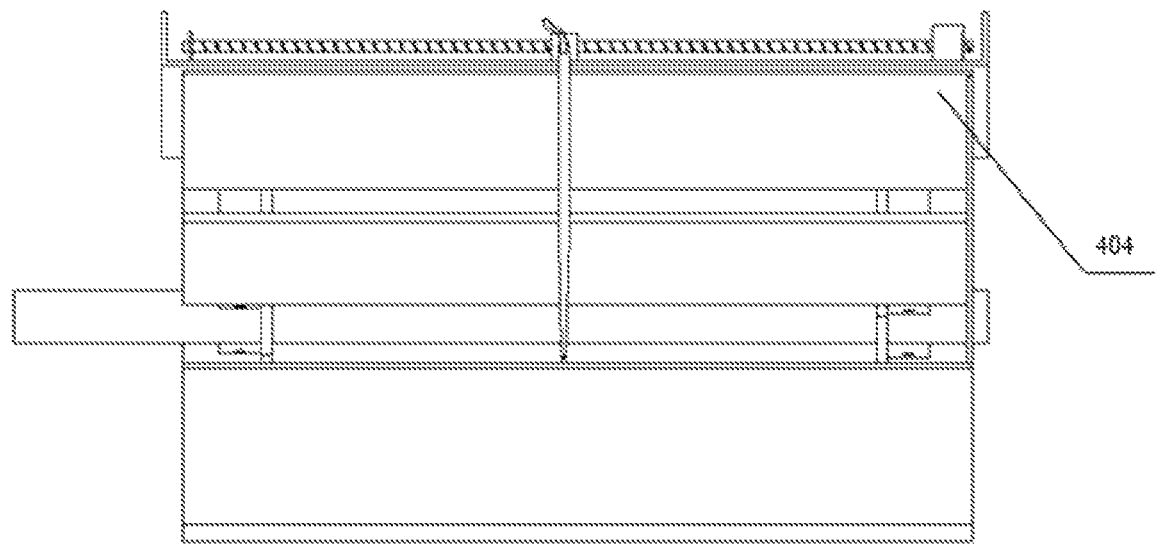
FIG. 6 is a front view of FIG. 3.
Figure 7:
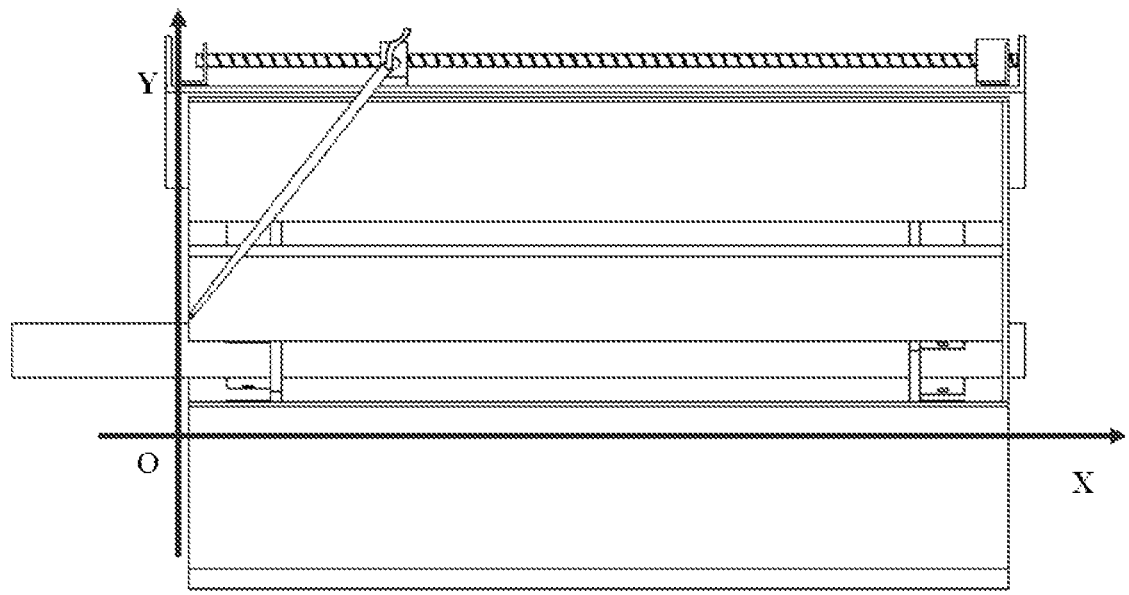
FIG. 7 is a diagram showing the position of the smoke releasing duct when the streamline pattern image at different points in the present invention is acquired.

As shown in FIGS. 4, 5 and 6, the detection system includes a smoke generation and transmission device 11, a two-degree-of-freedom smoke fixed-point release mechanism 12, a high-speed image acquisition system 13 and a control system 14. The smoke generation and transmission device 11 is used to produce smoke. The smoke generation and transmission device 11 includes a smoke generator 1101 and a smoke conducting hose 1102, the smoke generator 1101 produces white smoke with particle size ≤5 microns. The two-degree-of-freedom smoke fixed-point release mechanism 12 includes a smoke releasing duct 1201, a fixed base 1204, a linear moving guide rail device 1202, and a rotating mechanism 1203; the fixed base 1204 is installed at an upper end of the outlet of the cleaning centrifugal fan 4. The fixed base 1204 is mounted with the linear moving guide rail device 1202, and the traveling direction of the linear moving guide rail device 1202 is parallel to the axis of the rotating shaft of the centrifugal fan 4. The linear moving guide rail device 1202 is provided with a moving slider 1205. The moving slider 1205 is mounted with a rotating mechanism 1203. The smoke releasing duct 1201 is provided on the output end of the rotating mechanism 1203, and the smoke releasing duct 1201 is suspended from the outlet of the centrifugal fan 4. The smoke releasing duct 1201 and the smoke generation and transmission device 11 are connected through the smoke conducting hose 1102. As shown in FIGS. 5 and 7, the angle formed by the upper plate 404 of the air outlet and the cross section of the air outlet is recorded as β, and the angle formed by the smoke releasing duct 1201 and the angle between the smoke releasing duct 1201 and the output end of the rotating mechanism 1203 is recorded as α, i.e., α=β. That is, the output end of the rotary mechanism 1203 is parallel to the upper plate 404 of the air outlet, the smoke releasing duct 1201 is parallel to the cross section of the outlet of the fan, and the end of the smoke sent from outlet of the smoke releasing duct 1201 reaches the lower plate 405 of the air outlet in the vertical state. The fixed-point release of smoke at any position of the outlet of the fan can be realized by the superposition of the movement of the linear moving guide rail device 1202 and the rotating mechanism 1203.

The high-speed image acquisition system 13 is located outside the main body of the test bench and is used for high-speed acquisition of streamlined smoke images in the cleaning space and transmission of the images to the control system 14. The high-speed image acquisition system 13 includes high-definition stroboflash compensation light 1301, high-speed camera 1302, camera tripod 1303 and image transmission line 1304. The high-speed camera 1302 is fixed on camera tripod 1303 and connected with the control system 14 through image transmission line 1304. The high-speed camera 1302 shoots an angle perpendicular to the direction of airflow movement in the cleaning room, and the shooting angle covers the cleaning space for high-speed acquisition of dynamic streamlined smoke images formed by the action of the cleaning airflow. The high-definition stroboflash compensation light 1301 is symmetrically arranged on both sides of the high-speed camera 1302. It is used to supplement light for the high-speed camera shooting process and eliminate the shadow of streamlined smoke. The working frequency is 60 Hz to 300 Hz and the color temperature is 5000 to 7000K. It can automatically detect the frequency and exposure time of the camera.

The control system 14 is used to control the two-degree-of-freedom smoke fixed-point release mechanism 12 and store and analyze streamlined smoke images of the high-speed image acquisition system 13. The control system 14 includes a motor driving module a, an image acquisition and processing module b and a detection, analysis and diagnosis module c; the motor driving and controlling module a is used to drive and control the linear moving guide rail device 1202 and the rotating mechanism 1203; and the image acquisition and processing module b is used to collect, store and analyze the dynamic streamlined smoke image output by the high-speed image acquisition system 13; the detection, analysis and diagnosis module c is used to summarize, compare and diagnose the analysis results of the image acquisition and processing module b. The present invention can test the manufacturing and assembly quality of the cleaning system of the combine harvester by combining the characteristics of wind tunnel streamline pattern with image processing and corresponding mathematical operation.

Figure 9:
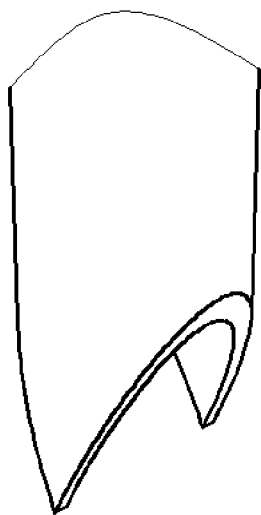
FIG. 9 is a perspective view of the smoke releasing duct of the present invention.
Figure 10:
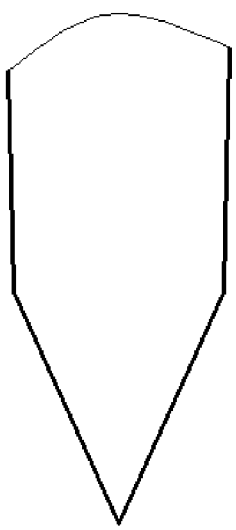
FIG. 10 is a front elevational view of FIG. 9.

As shown in FIG. 9 and FIG. 10, the outlet of the smoke releasing duct 1201 has a "V" shape, and the acute angle formed by the two cross sections of the "V" type and the flow direction of the cleaning centrifugal fan 4 is not less than 60°, this can form a bifurcated structure, reducing drag and facilitating airflow.

Figure 11:
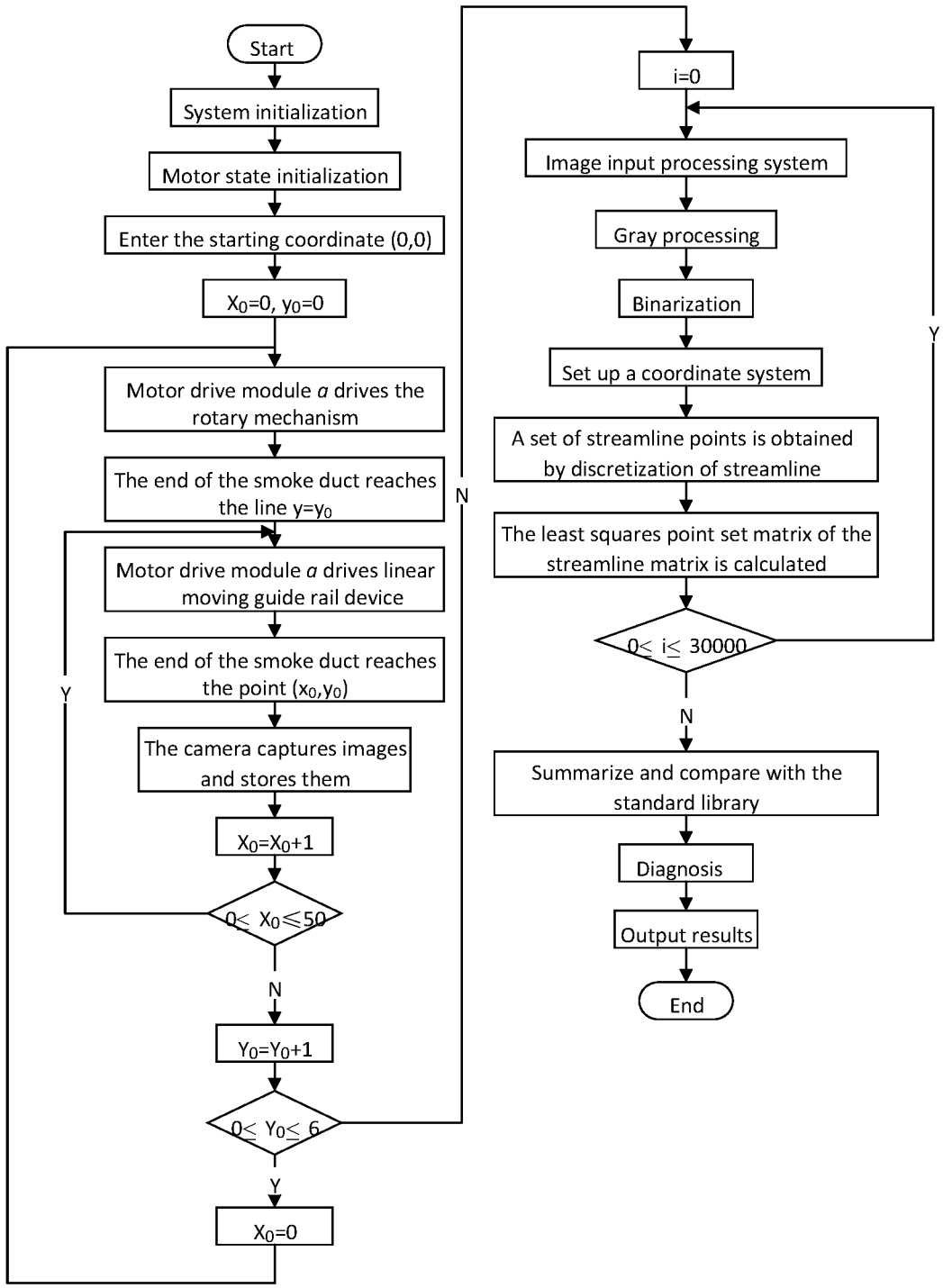
FIG. 11 is a flow chart of an assembly quality testing method for a wind screen cleaning system based on streamline pattern according to the present invention.

As shown in FIG. 11, the assembly quality detection method for the wind screen cleaning system based on streamline pattern of the present invention includes the following steps:

A1: As shown in FIG. 6, the fan outlet section is divided into 5×49 small areas, with 6×50 points. The point at the lower left corner of the fan section is taken as the vertex O, the axial direction is set as X axis ($0 \leq x \leq 49$), the longitudinal direction is set as Y axis ($0 \leq y \leq 5$), and the coordinate of any point in the fan section is set as (x, y).

A2: When the frame frequency of the high-speed camera 1302 is set to 100 frames, the starting coordinate value (0, 0) is input into the motor driving module a when the streamline spectrum image is collected, that is, $x_0=0$, $y_0=0$. Motor driving module a controls the movement of linear moving guide rail device 1202 and rotating mechanism 1203 to rotate the end of smoke releasing duct 1201 to coordinate value (0,0). High-speed camera 1302 collects and stores images.

A3: The value of abscissa $x_0$ adds 1 and then determine whether the value of $x_0$ exceeds 50. If not, repeat step A2; otherwise, proceed to step A4.

A4: The value of $y_0$ adds 1 and then determine whether the value of $y_0$ exceeds 6. If not, repeat step A2 to A3; otherwise, proceed to step A5.

A5: Streamline pattern images of all points in the cross section are obtained, totaling 30,000 images. The image acquisition and processing module b analyses 30000 streamline pattern images captured by high-speed camera, which are as follows:

S01: Noting i as image number, $1 \leq i \leq 30000$; initial value i=1, gray level processing, binarization and establishment of coordinate system are performed on the ith image. The coordinate values of streamline discrete points in the second image are recorded as $a_{i,k}$ where K denotes the ordinal number of each discrete point, $k \in N^+$;

S02: determining coordinate value matrix of each discrete point of streamline in the ith image is $A_i=[a_{i,1}, a_{i,2}, a_{i,3}, \ldots a_{i,k}]$;

S03: When i<30000, i=i+1, repeating steps S01-S02; when i=30000, jumping to S04;

S04: calculating the mean discrete point set of all collected images $A=30000^{-1}\Sigma_{i=1}^{i=30000} A_i$;

S05: calculating the least squares fitting curve of the streamline matrix: y1=ployfit(A(1,:), A(2,:), 3); the resulting least squares fitting curve is the streamline pattern after the sum of all the images obtained.

A6: The streamline pattern of all images are delivered to the detection, analysis diagnostic module c, the detection, analysis diagnostic module c compares and diagnoses the streamline pattern of all images to the streamline pattern in the standard library.

The embodiments are preferred implementations of the present invention, but the present invention is not limited to the above embodiments. Without departing from the essence of the present invention, any obvious improvements, substitutions or variations that can be made by the person skilled in the art belong to the protection scope of the present invention.

The invention claimed is:

1. An assembly quality detecting device for wind screen cleaning system based on streamline pattern, the device comprising:
   a main body of a test bench and a detection system, the main body of the test bench comprises a test bench rack and a cleaning centrifugal fan; the cleaning centrifugal fan is installed on the test bench rack; and a cleaning space is arranged inside the test bench rack;
   the detection system comprises a smoke generation and transmission device, a two-degree-of-freedom smoke fixed-point release mechanism, a high-speed image acquisition system and a control system; the smoke generation and transmission device is used to produce smoke; the two-degree-of-freedom smoke fixed-point release mechanism is connected with the smoke generation and transmission device to move the smoke to the outlet of the cleaning centrifugal fan;
   the high-speed image acquisition system is located outside the main body of the test bench, and is used for high-speed acquisition of streamlined smoke images in the cleaning space and transmission of the images to the control system; the control system is used to control the two-degree-of-freedom smoke fixed-point release mechanism and store and analyze the images.

2. The assembly quality detection device for the wind screen cleaning system based on streamline pattern according to claim 1, wherein the two-degree-of-freedom smoke fixed-point release mechanism comprises a smoke releasing duct, a fixed base, a linear moving guide rail device and a rotating mechanism; the fixed base is installed at the upper end of the outlet of the cleaning centrifugal fan; the fixed base is equipped with a linear moving guide rail device, and the moving direction of the linear moving guide rail device is parallel to the axis of the rotating shaft of the cleaning centrifugal fan and the linear moving guide rail device is provided with a moving slider, and a rotating mechanism is installed on the moving slider, the smoke releasing duct is installed at the output end of the rotating mechanism (1203), and the smoke releasing duct is suspended at the outlet of the cleaning centrifugal fan; the smoke releasing duct is communicated with the smoke generation and transmission device.

3. The assembly quality detection device for the wind screen cleaning system based on streamline pattern according to claim 1, wherein the upper boundary of the cleaning space is composed of a tangential flow concave plate and a longitudinal axial flow concave plate, the upper boundary of the cleaning space is above the cleaning centrifugal fan, and the middle boundary of the cleaning space is between the upper boundary of the cleaning space and the cleaning centrifugal fan, and the middle boundary of the cleaning space is composed of a cleaning screen; the lower boundary of the cleaning space is located at the outlet of the cleaning centrifugal fan, and the lower boundary of the cleaning space is composed of the lower air duct of the cleaning room; the rear boundary and the front boundary of the cleaning space are located on both sides of the rotating shaft of the cleaning centrifugal fan, respectively; the rear boundary of the cleaning space is composed of an inner plate, and the front boundary of the cleaning space is composed of an outer plate, the inner plate and outer plate are mounted on the test bench rack.

4. The assembly quality detection device of the wind screen cleaning system based on streamline pattern according to claim 3, wherein the outer plate is transparent plate, the surface of the inner plate is dark, and the high-speed image acquisition system is directly facing the outer plate.

5. The assembly quality detection device for the wind screen cleaning system based on streamline pattern according to claim 1, wherein the high-speed image acquisition system comprises a high-definition stroboflash compensation light and a high-speed camera; the high-speed camera shooting angle is perpendicular to the direction of airflow movement in the cleaning room, and the shooting angle covers the cleaning space for high-speed acquisition of dynamic streamlined smoke images formed by the action of the cleaning airflow; the high-definition stroboflash compensation light is symmetrically arranged on both sides of the high-speed camera to supplement light and eliminate streamlined smoke shadows for high-speed camera processes.

6. The assembly quality detection device for the wind screen cleaning system based on streamline pattern according to claim 1, wherein the control system comprises a motor driving and module a, an image acquisition and processing module b and a detection, analysis and diagnosis module c; and the motor driving module a is used for driving and controlling the linear moving guide rail device and the rotating mechanism, the image acquisition and processing module b is used to collect, store and analyze the dynamic streamlined smoke image output by the high-speed image acquisition system, and the detection, analysis and diagnosis module c is used to summarize, compare and diagnose the analysis results of the image acquisition and processing module b.

7. The assembly quality detection device for the wind screen cleaning system based on streamline pattern according to claim 1, wherein the white smoke with particle size less than or equal to 5 micron is produced by the smoke generation and transmission device.

8. The assembly quality detection device for the wind screen cleaning system based on streamline pattern according to claim 2, wherein the outlet of the smoke releasing duct has a "V" shape, and the acute angle formed by the two cross sections of the "V" type and the flow direction of the cleaning centrifugal fan is not less than 60°.

9. A method for assembling a quality detection device for a wind screen cleaning system based on streamline pattern according to claim 1 comprising the following steps:
   section division of air outlet: dividing the air outlet section of the cleaning centrifugal fan into an N×M area, taking the point at the lower left corner of the fan section as the apex O, and setting the coordinate of any point in the air outlet section of the cleaning centrifugal fan to be (x, y), wherein $0 \leq x \leq M$, $0 \leq y \leq N$, N and M are natural numbers;
   initial position image acquisition: setting $x_0=0$, $y_0=0$, the motor driving module a of the control system controls the linear moving guide rail device and the rotating mechanism to move the end of the smoke releasing duct to the starting coordinate value $(x_0, y_0)$, the smoke generation and transmission device starts to generate smoke, the high speed camera captures at a T frame rate, and delivers the collected image to the image acquisition and processing module b;

streamline pattern image acquisition of all outlet cross-section areas: the linear moving guide rail device and the rotating mechanism are controlled by the motor drive module a of the control system to move the end of the smoke releasing duct to all outlet cross-section areas respectively, and the images collected by the high-speed camera are F sheets;

streamline pattern acquisition via image analysis: image acquisition and processing module b analyses F images and gets streamline pattern of all images;

streamline pattern comparison and diagnosis: streamline pattern of all images is transmitted to the detection, analysis and diagnosis module c, the detection, analysis and diagnosis module c compares and diagnoses the streamline pattern of all images with streamline pattern in standard library.

10. The method for assembly quality detection device for the wind screen cleaning system based on streamline pattern according to claim 9, wherein the streamline pattern image analysis comprises the following steps:

S01: determining the coordinates of discrete points of streamline in the ith image: noting i as image number, $1 \leq i \leq F$; initial value i=1, carrying out grayscale processing, image binarization and establishing coordinate system for the ith image, obtaining the coordinates of discrete points of streamline in the ith image and marking them as $a_{i,k}$ wherein k denotes the ordinal number of each discrete point, $k \in N^+$;

S02: determining the coordinate value matrix of each discrete point of streamline in the ith image as: $A_i=[a_{i,1}, a_{i,2}, a_{i,3} \ldots a_{i,k}]$;

S03: recycling of judgment, when i<F, then 1=1+1, repeating steps S01-S02; when i=F, jumping to S04;

S04: calculating the averaged discrete point set for all acquired images: $A=F^{-1}\Sigma_{i=1}^{i=F}A_i$;

S05: calculating the least squares fitting curve of the streamline matrix: $y_1=\text{ployfit}(A(1,:),A(2,:),3)$; the obtained least squares fitting curve is the streamline pattern of all the images obtained after the aggregation.

\* \* \* \* \*